United States Patent [19]
Lordi et al.

[11] Patent Number: 5,657,346
[45] Date of Patent: Aug. 12, 1997

[54] TRANSMISSION LINE DRIVER TEST INTEGRITY CIRCUIT

[76] Inventors: Angela Lee Lordi, 2043 Fort Bevon Rd., Harleysville, Pa. 19438; Karl T. Kummer, 219 Washington St., Doylestown, Pa. 18901; Robert W. Bristow, 106 Sourwood Dr., Hatboro, Pa. 19040

[21] Appl. No.: 542,751

[22] Filed: Oct. 13, 1995

[51] Int. Cl.$^6$ .................... H04B 3/46; H04B 17/00; H04B 3/00
[52] U.S. Cl. .................................. 375/224; 375/257
[58] Field of Search .................... 375/224, 219, 375/257; 371/20.1, 22.3, 28, 24; 370/241, 248; 379/1, 27

[56] References Cited

U.S. PATENT DOCUMENTS

| | | | |
|---|---|---|---|
| 5,140,625 | 8/1992 | Reum et al. | 375/224 |
| 5,146,401 | 9/1992 | Bansal et al. | 364/138 |
| 5,164,960 | 11/1992 | Wincn et al. | 375/224 |
| 5,175,750 | 12/1992 | Dononvan et al. | 375/257 |
| 5,509,029 | 4/1996 | Furuta | 375/224 |

Primary Examiner—Tesfaldet Bocure
Attorney, Agent, or Firm—Arthur A. Sapelli

[57] ABSTRACT

The apparatus detects error in transceivers of individual modules connected to a communication network, the network being a two-line network. The apparatus comprises a reference voltage source to output a first and second reference voltage value in response to a control signal. A controller controls a predefined sequence of steps in performing a test to detect the errors of the transceivers. A first and second comparator compares a voltage of the corresponding first and second line to a select first and second reference voltage as commanded by the sequence of steps of the test sequence. A first and second latch device is triggered by an output signal of a corresponding first and second comparator as a result of the compare operation, the first and second latch device being placed in a state which indicates the relative voltage level of the signal to the reference voltage and is subsequently detected by the processor to determine whether the voltage level of the first line and second line is stuck at a fixed predetermined level thereby indicating an error of the transceiver under test.

7 Claims, 3 Drawing Sheets

TRANSMISSION LINE DRIVER TEST INTEGRITY CIRCUIT

BACKGROUND OF INVENTION

This invention relates to circuitry for detecting errors, and more particularly, to circuitry for detecting errors in transceivers of a communication network.

Modules which are coupled to a network generally utilized a driver/receiver pair (a transceiver) to interface with the network. For a network (or link) utilizing a balanced transmission line configuration, the transceiver is a differential pair (differential driver) having A+ and A− terminals. For a balanced transmission line utilizing EIA Standard RS-485, digital signals on the A+ terminal swing between +V volts and 0 volts, while the A− terminal will have digital signals which swing between 0 volts and +V volts, respectively, in a manner well known to those skilled in the art. When an error occurs in one of the drivers, an error mode exists whereby one of the output terminal is stuck at approximately V/2 volts while the other terminal is going through a normal swing between 0 volts and V volts. The net result at the receiver is that of a valid signal. The transmission continues but is unreliable and susceptible to noise thereby reducing the reliability of the transmission and of the system.

Thus there is a need to be able to test the driver (transmitting driver) to verify proper operation of the driver and thus to insure valid communications between modules connected to a network.

SUMMARY OF THE INVENTION

Thus there is provided by the present invention, a test circuit to verify the integrity of the transceiver. The apparatus detects errors in transceivers of individual modules connected to a communication network, the network being a two-line network, and the information being transmitted by a first and second signal over a first and second line of the two-line network, respectively. The first signal is 180 degrees out of phase with the second signal. The apparatus comprises a reference voltage source to output a first and second reference voltage value in response to a control signal. A controller controls a predefined sequence of steps in performing a test to select the errors of the transceivers. A first and second comparator, each comparator having a first and second input, and further having an output, the second input of the first comparator being connected to the first line of the two-line network and the second input of the second comparator being connected to the second line of the two-line network, and the first input of each comparator connected to the reference voltage source compares a voltage of the corresponding first and second line to a select first and second reference voltage as commanded by the sequence of steps of the test sequence. A first and second latch device, each having an enabling input, the enabling input of each latch device connected to the output of the first and second comparator, respectively, such that when a respective enabling input is triggered by an output signal of a corresponding first and second comparator, the first and second latch device is placed in a state which is subsequently detected by the processor to determine whether the voltage level of the first line and second line is stuck at a fixed predetermined level thereby indicating an error of the transceiver under test.

Accordingly, it is an object of the present invention to provide a circuit to test a transceiver of a module.

It is another object of the present invention to provide a circuit to test a transceiver of a module connected to transmission line.

These and other objects of the present invention will become more apparent when taken in conjunction with the following description and attached drawings, wherein like characters indicate like parts, and which drawings form a part of the present application.

DETAILED DESCRIPTION

Figure 1:
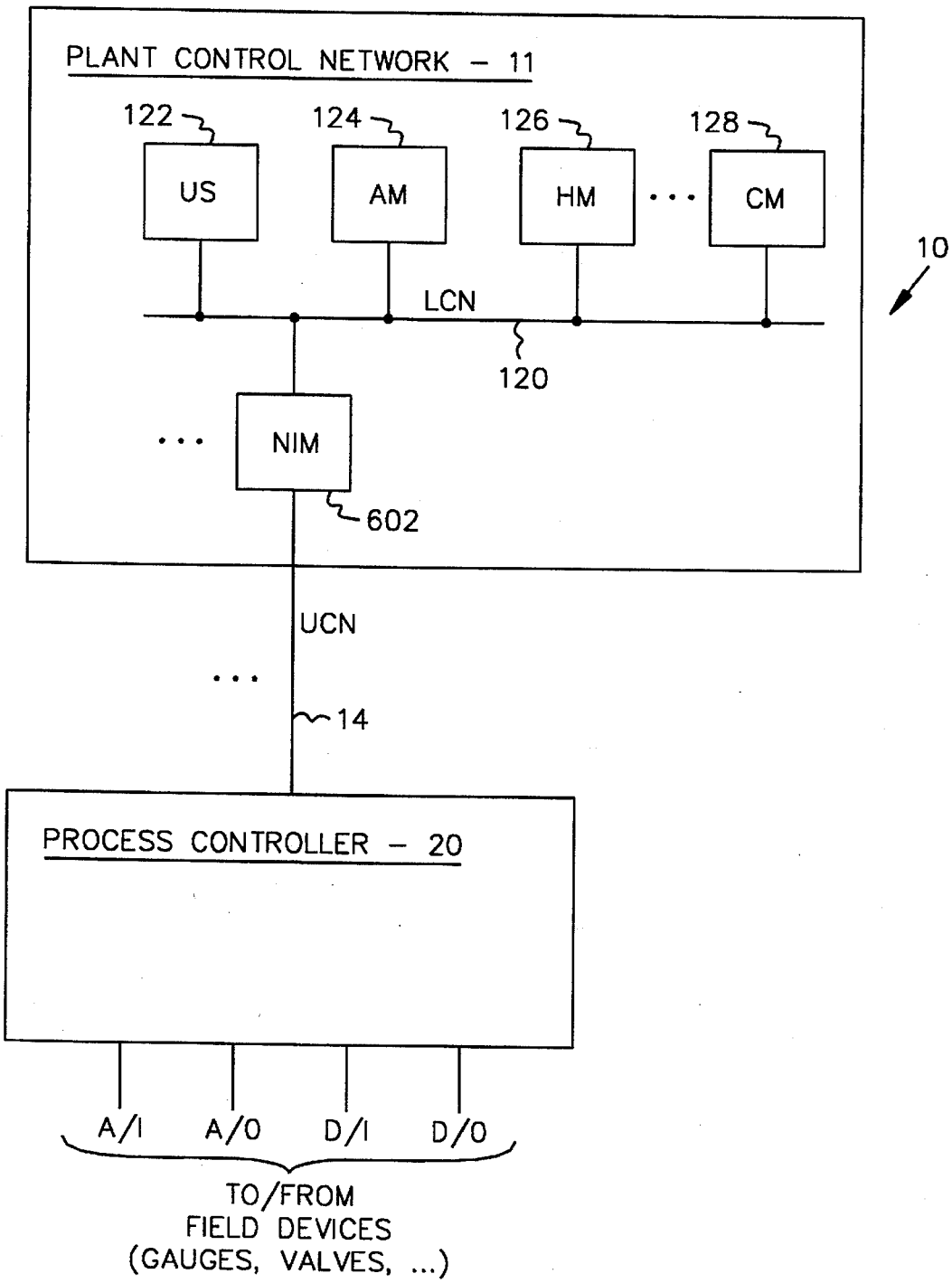
FIG. 1 shows a block diagram of a process control system which includes interface apparatus in which the present invention can be included.

Before describing the verification of an interface apparatus of the present invention, it will be helpful in understanding a system environment in which the interface apparatus can be utilized. Referring to FIG. 1, there is shown a block diagram of a process control system 10 which includes the interface apparatus. The process control system 10 includes a plant control network 11, and connected thereto is a process controller 20. The process controller 20 is operatively connected to the plant control network 11 via a universal control network (UCN) 14 to a network interface module (NIM) 602. The process controller 20 interfaces the analog input and output signals, and digital input and output signals (A/I, A/O, D/I, and D/O, respectively) to the process control system 10 from the variety of field devices (not shown) which include valves, pressure switches, pressure gauges, thermocouples, . . . .

The plant control network 11 provides the overall supervision of the controlled process, in conjunction with the plant operator, and obtains all the information needed to perform the supervisory function, and includes an interface with the operator. The plant control network 11 includes a plurality of physical modules, which include a universal operator station (US) 122, an application module (AM) 124, a history module (HM) 126, a computer module (CM) 128, and duplicates of these modules (and additional types of modules, not shown) as necessary to perform the required control/supervisory function of the process being controlled. Each of these physical modules is operatively connected to a local control network (LCN) 120 which permits each of these modules to communicate with each other as necessary. A more complete description of the plant control network 11, and the physical modules can be had by reference to U.S. Pat. No. 4,607,256.

Figure 2:
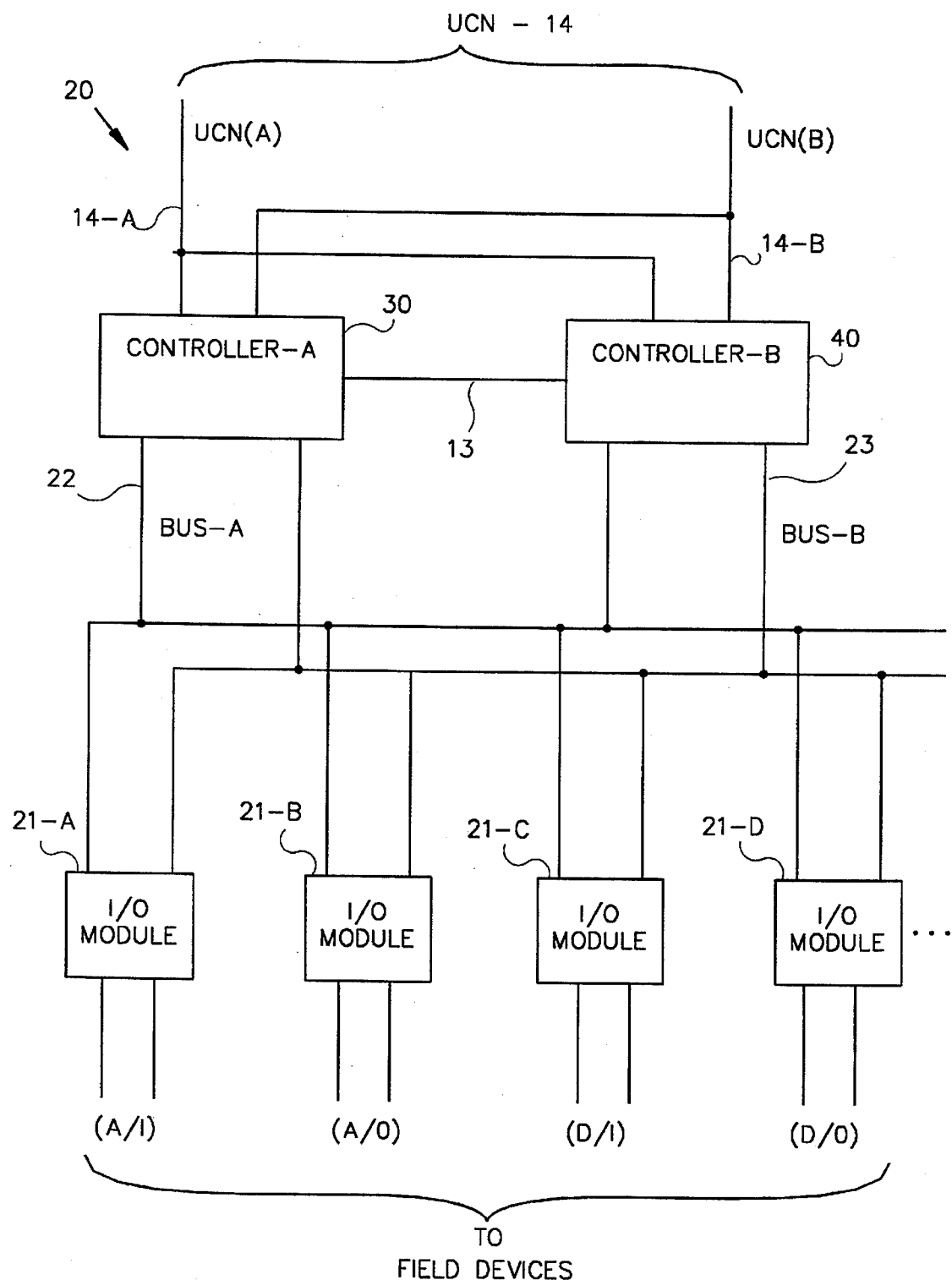
FIG. 2 shows a block diagram of the interface apparatus of FIG. 1.

Referring to FIG. 2, there is shown a block diagram of the process controller 20, i.e., the interface apparatus. The process controller 20 of the preferred embodiment includes a controller A 30 and a controller B 40, which effectively operate as a primary and secondary controller. Input output (I/O) modules 21 interface to field devices, field devices being various valves, pressure switches, pressure gauges, thermocouples, . . . which can be analog inputs (A/I), analog outputs (A/O), digital inputs (D/I), and digital outputs (D/O). The controller A 30 interfaces to each I/O module 21 via a bus A 22, and controller B 40 interfaces to each I/O module 21 via a bus-B 23. In addition, for communication redundancy purposes, controller A 30 is also connected to bus-B and controller B 40 is also connected to bus-A 22. A more complete description of the controller 30 can be had by reference to U.S. Pat. No. 5,146,401.

Figure 3:
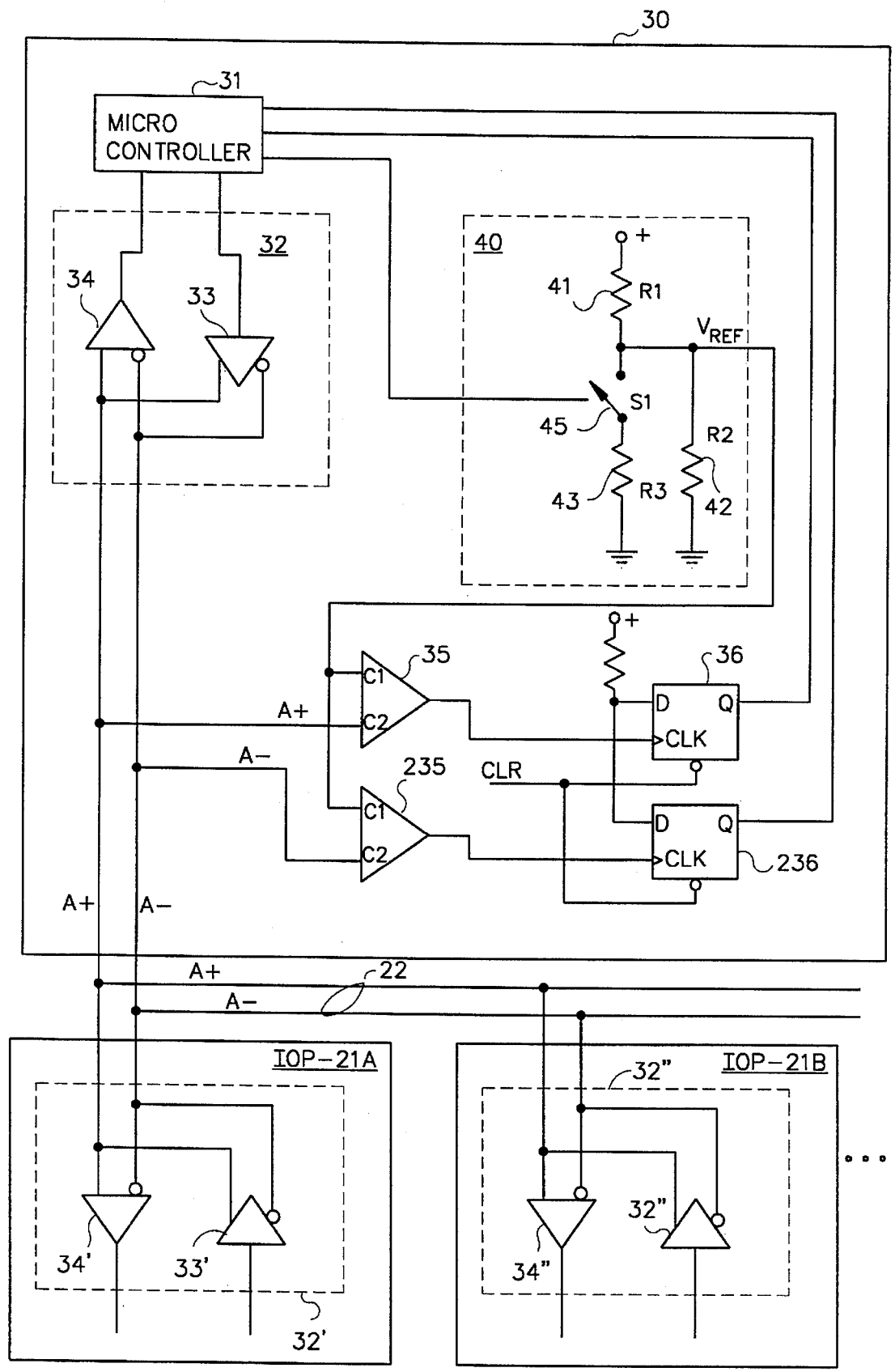
FIG. 3 shows a partial functional block diagram of the interface apparatus including the test integrity circuit of the preferred embodiment of the present invention.

The verification circuit of the present invention will now be described. Referring to FIG. 3, there is shown a partial functional block diagram of the controller A 30, and the I/O modules 21, each coupled to bus-A 22 (redundant controller B 40 and redundant bus-B 23 are not shown here for the sake of simplicity). The diagram of FIG. 3 only includes the logic relating to interfacing the bus to describe the test integrity circuit of the preferred embodiment of the present invention.

The controller 30 of the preferred embodiment includes a micro-controller 31 (in the preferred embodiment an Intel 80c31), and a transceiver 32. The transceiver 32 includes a transmitter driver 33 and a receiver 34. The bus 22 is a balanced transmission line which conforms to EIA Standard RS-485, the two lines of the transmission lines being the denoted A+ and A−. The transceiver 32 is connected to the bus 22 for interfacing with the I/O modules 21 (sometimes referred to herein as IOP 21). A reference resistor divider network 40 includes resistors R1, R2, and R3, 41, 42, and 43, respectively, to generate a reference voltage Vref of either 3.8 volts or 1.5 volts in the preferred embodiment of the present invention. The resistor R3 includes a switch S1 45 in series with the resistor R3, the switch being controlled via a first control signal by the micro-controller 31. A first comparator 35 has a first input C1 connected to the reference voltage Vref of the resistor divider network 40. A second input C2 of the comparator 35 is connected to the A+ line of bus 22. The output of the comparator 35 is coupled to a clock input (CLK) of a D-type flip flop 36, the D input of the flip flop 36 being connected to a predetermined voltage level. The output of the D-type flip flop 36, Q, is coupled to the micro-controller 31 such that the micro-controller can determine the status of the flip flop 36. The flip flop 36 can also be cleared via a clear (CLR) control line under control of the micro-controller 31 in a manner well known to those skilled in the art. A second comparator 235 is also included in the controller 30 having a first input C1 connected to the reference voltage Vref and a second input C2 connected to the A− line of the bus 22. The output of the second comparator 235 is coupled to the clock input of a second D-type flip flop 236, the output of the second D-type flip flop 236 being coupled to the micro-controller 31. Each IOP 21 includes a like transceiver 32', 32", . . . , the transceiver of each IOP 21 being connected to the respective A+, A− line of bus 22. In this manner the controller and IOP's are interfaced together via the bus 22.

An information signal transmitting on the bus 22 swings between +5 volts and 0 volts on the A+ line, and between 0 volts and +5 volts (i.e., the inverse) on the A− line in the preferred embodiment of the present invention. The RS-485 Standard is defined such that an input difference on the receiver 34, 34', 34", of greater than 200 milli-volts, results in the input signal being accepted as a valid signal. When one of the outputs fail in a predetermined failure mode (there is a failure of one of the output terminals of the driver 33, 33', 33") the failed output stays at a voltage of about 2.5 volts, and the other output terminal is still varying normally between the 0 and 5 volts. In this case, there is enough threshold at the input receiver 34 to appear as though there is a valid signal at the receivers. In this case the transmission continues for awhile but is unreliable and is susceptible to noise thereby reducing the reliability of the transmission and of the system.

In a test mode, the micro-controller 31 insures that the switch S1 45 is opened thereby having the reference Vref set at about 3.8 volts in the preferred embodiment of the present invention. In order to verify the A+ terminal of the transmitter 33 of the controller 30, the flip flop 36 is cleared and a transmission is commanded from the transmitter 33. If the output transmission reaches a +5 volts the output of the comparator 35 is such that a pulse is generated (the A+ input at terminal C2 of comparator 35 is greater than 3.8 volts), the pulse is coupled to the clock input of the flip flop 36 thereby setting the flip flop 36 to a logic 1. The micro-controller subsequently detects that the flip flop 36 is set thereby concluding that a +5 level in the A+ signal has been attained (i.e., a level greater than 3.8 volts). The next cycle of the test clears the flip flop 36 and closes the switch S1 such that the voltage reference Vref is 1.5 volts. The output is enabled such that zero data is being outputted on the transmission line. In this case no output should occur from the comparator 35 in the normal case, indicating that the output line is at a minus volt (i.e., less than the 2.5 volts of the failure mode being tested). The output of the flip flop 36 is then checked by the micro-controller 31 to insure that the Q output is at a logic 0, thereby indicating that the voltage is less than 1.5 volts. The same test sequence is then repeated using the A− line thereby verifying the output terminal of the driver 33 of both the A+ and A− output terminals are operating normally.

In a failure mode with an output terminal "stuck" at approximately 2.5 volts, in the first instance the output of the comparator would be a logic 0 concluding that the output terminal of the A+ side of the driver 33 is less than 3.8 volts. Similarly in the second instance, the output of the flip flop would be a logic 1 indicating that the signal on the A+ line is greater than the 1.5 volts, i.e., somewhere between 1.5 and 3.8, namely 2.5 volts. This is a good indication that the driver has failed in the mode being tested.

The drivers from the IOP's 21A, 21B, . . . can also be checked by initializing the voltage reference and the D-type flip flop, and then commanding a transmission from the IOP in a normal communication scheme set up between the micro-controller 31 of controller 30 and the micro-controller (not shown) of the IOP, and checking the respective flip flops for the A+ and A− lines of bus 22. In this case only one IOP would be commanded to transmit at a time thereby giving a definitive indication of the IOP being tested. Thus, in the manner described above the transceivers of the devices connected to the balanced transmission bus 22, can be checked out thereby insuring the reliable transmission between the interface devices via the bus 22. In systems having redundancy such as has been described above with regard to bus-B 23, and a backup controller 40, the check can be repeated utilizing controller B 40 and bus-B 23.

Although a two-wire network has been discussed, it will be understood by those skilled in the art that other media can be used, e.g., a two-line fiber optic cable, . . . .

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

We claim:

1. An apparatus for detecting errors in transceivers of individual modules connected to a communication network, the network being a two-line network, the information being transmitted by a first and second signal over a first and, second line of the two-line network, respectively, the first signal being 180 degrees out of phase with the second signal, said apparatus comprising:

a) a reference voltage source to output a first and second reference voltage value in response to a control signal;

b) a controller for controlling a predefined sequence of steps in performing a test to detect the errors of the transceivers;

c) a first and second comparator, each comparator having a first and second input, and further having an output, the second input of the first comparator being connected to the first line of the two-line network and the second input of the second comparator being connected to the second line of the two-line network, and the first input of each comparator connected to the reference voltage source, compares a voltage of the corresponding first and second line to a select first and second reference voltage as commanded by the sequence of steps of the test sequence; and d) a first and second latch device, each having an enabling input, the enabling input of each latch device connected to the output of the first and second comparator, respectively, such that when a respective enabling input is triggered by an output signal of a corresponding first and second comparator, the first and second latch device is placed in a state which is subsequently detected by the processor to determine whether the voltage level of the first line and second line is stuck at the fixed predetermined level thereby indicating an error of the transceiver under test.

2. An apparatus for detecting errors in transceivers according to claim 1, wherein the communication network is a balanced transmission line.

3. An apparatus for detecting errors in transceivers according to claim 1 wherein the communication network is a two-wire network.

4. An apparatus for detecting errors in transceivers according to claim 2 wherein the first and second signal is a digital signal.

5. An apparatus for detecting errors in transceivers according to claim 3, wherein the first and second signal is a digital signal.

6. An apparatus for detecting errors in transceivers according to claim 4, wherein the first and second signal are complementary signals.

7. An apparatus for detecting errors in transceivers according to claim 5, wherein the first and second signal are complementary signals.

* * * * *